(12) United States Patent
Nakagawara (10) Patent No.: US 9,674,424 B2
(45) Date of Patent: Jun. 6, 2017

(54) IMAGING APPARATUS AND CONTROL METHOD

(71) Applicant: CANON KABUSHIKI KAISHA, Tokyo (JP)

(72) Inventor: Naoyuki Nakagawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/161,912

(22) Filed: May 23, 2016

(65) Prior Publication Data

US 2016/0269618 A1    Sep. 15, 2016

Related U.S. Application Data

(63) Continuation of application No. 13/369,923, filed on Feb. 9, 2012, now Pat. No. 9,374,533.

(30) Foreign Application Priority Data

Feb. 15, 2011 (JP) .................................. 2011-029970
Feb. 15, 2011 (JP) .................................. 2011-029996

(51) Int. Cl.
| | |
|---|---|
| H04N 5/235 | (2006.01) |
| H04N 5/232 | (2006.01) |
| G03B 13/36 | (2006.01) |
| H04N 5/347 | (2011.01) |
| H04N 5/353 | (2011.01) |

(52) U.S. Cl.
CPC ......... *H04N 5/23212* (2013.01); *G03B 13/36* (2013.01); *H04N 5/2351* (2013.01); *H04N 5/2353* (2013.01); *H04N 5/2357* (2013.01); *H04N 5/23219* (2013.01); *H04N 5/347* (2013.01); *H04N 5/353* (2013.01)

(58) Field of Classification Search
CPC ............. H04N 5/23212; H04N 5/2353; H04N 5/23219; H04N 5/2351; G03B 13/36
USPC ................................ 348/226.1, 227.1, 228.1
See application file for complete search history.

(56) References Cited

U.S. PATENT DOCUMENTS

| 2003/0179310 A1* | 9/2003 | Irie ....................... H04N 5/2351 348/349 |
| 2010/0208127 A1* | 8/2010 | Takada ..................... G02B 7/28 348/349 |

\* cited by examiner

*Primary Examiner* — Padma Haliyur
(74) *Attorney, Agent, or Firm* — Canon USA, Inc. I.P. Division

(57) ABSTRACT

An imaging apparatus including an electric charge accumulation unit configured to accumulate electric charge in accordance with an incident light quantity; a tracking unit configured to perform tracking; and an exposure control unit configured to perform exposure control, wherein the electric charge accumulation unit performs a first accumulation, and then performs a second accumulation after the first accumulation, wherein the tracking unit performs the tracking based on an image signal obtained through the first accumulation, and wherein the exposure control unit computes a control value for the exposure control based on at least the image signal obtained through the second accumulation of the image signal obtained through the first accumulation and an image signal obtained through the second accumulation.

13 Claims, 7 Drawing Sheets

FIG.7D

IMAGING APPARATUS AND CONTROL METHOD

CROSS-REFERENCE TO RELATED APPLICATIONS

This application is a continuation, and claims the benefit, of U.S. patent application Ser. No. 13/369,923, presently pending and filed on Feb. 9, 2012, and claims the benefit of, and priority to, Japanese Patent Application No. 2011-029970 filed Feb. 15, 2011 and Japanese Patent Application No. 2011-029996 filed Feb. 15, 2011, which applications are hereby incorporated by reference herein in their entireties.

BACKGROUND OF THE INVENTION

Field of the Invention

The present invention relates to an imaging apparatus capable of tracking a subject.

Description of the Related Art

There is conventionally an imaging apparatus equipped with a so-called subject tracking function which recognizes the position of a main subject in an imaging frame and automatically tracks its position. By using this subject tracking function, it is possible to continuously perform automatic focusing control (AF control) and exposure control with respect to a moving main subject.

As an example of an imaging apparatus equipped with such a subject tracking function, Japanese Patent Application Laid-Open No. 7-110429 discusses an imaging apparatus such as a single-lens reflex camera which has a light metering unit for light metering separate from an imaging element and which tracks a subject based on light metering data output from the light metering unit. However, in the case where subject tracking is performed based on light metering data output from a light metering unit as in the case of the imaging apparatus discussed in Japanese Patent Application Laid-Open No. 7-110429, the following issues arise.

In an ordinary single-lens reflex camera like the imaging apparatus discussed in Japanese Patent Application Laid-Open No. 7-110429, the position of a quick return mirror provided in the camera is moved to switch between a state in which the incident light from the subject is guided to an imaging element and a state in which it is guided to an eyepiece (optical finder).

When the incident light from the subject is guided to the eyepiece, the incident light from the subject is also guided to a light metering unit, making is possible to perform light metering on the subject. In other words, in the state in which the incident light from the subject is guided to the imaging element, light metering cannot be performed at the light metering unit.

More specifically, when the state in which the incident light from the subject is guided to the imaging element and the state in which it is guided to the light metering unit, are successively switched with a short period, as in the case of continuous shooting, the accumulation time of light metering at the light metering unit is limited. In particular, when the light metering data output from the light metering unit is used for subject tracking, it is necessary to complete the subject tracking computation before AF control or exposure control is performed, with the result that the accumulation time is further limited than the period in which the incident light from the subject is guided to the light metering unit.

As a result, the accumulation time of the light metering unit is shorter than the flicker period, which results in an increase in the influence of the flicker, making it unlikely to obtain an accurate light metering value. Here, the flicker will be described. When light metering is performed under a fluorescent lamp or the like, there occurs a so-called flicker phenomenon, in which the brightness of the illumination light periodically varies due to the influence of an AC power frequency. In an area where the power frequency is 50 Hz, the flicker period is approximately 10 ms; in an area where it is 60 Hz, the flicker period is approximately 8.3 ms. When light metering is performed in such an environment, if the accumulation time of the light metering unit is not an integral multiple of the flicker period, a light metering value varies depending on a portion of the phase of the flicker period with which the accumulation period overlaps. Thus, it is difficult to perform exposure control in a stable manner.

If, in view of this, the accumulation time of the light metering unit is lengthened in order to reduce the influence of the flicker, the requisite time until completing the subject tracking computation is also lengthened, resulting in reduction in a shooting speed at the time of continuous shooting.

SUMMARY OF THE INVENTION

According to an aspect of the present invention, an imaging apparatus includes: an electric charge accumulation unit configured to accumulate electric charge in accordance with an incident light quantity; a tracking unit configured to perform tracking; and an exposure control unit configured to perform exposure control, wherein the electric charge accumulation unit performs a first accumulation, and then performs a second accumulation after the first accumulation, wherein the tracking unit performs the tracking based on an image signal obtained through the first accumulation, and wherein the exposure control unit computes a control value for the exposure control based on at least the image signal obtained through the second accumulation of the image signal obtained through the first accumulation and an image signal obtained through the second accumulation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
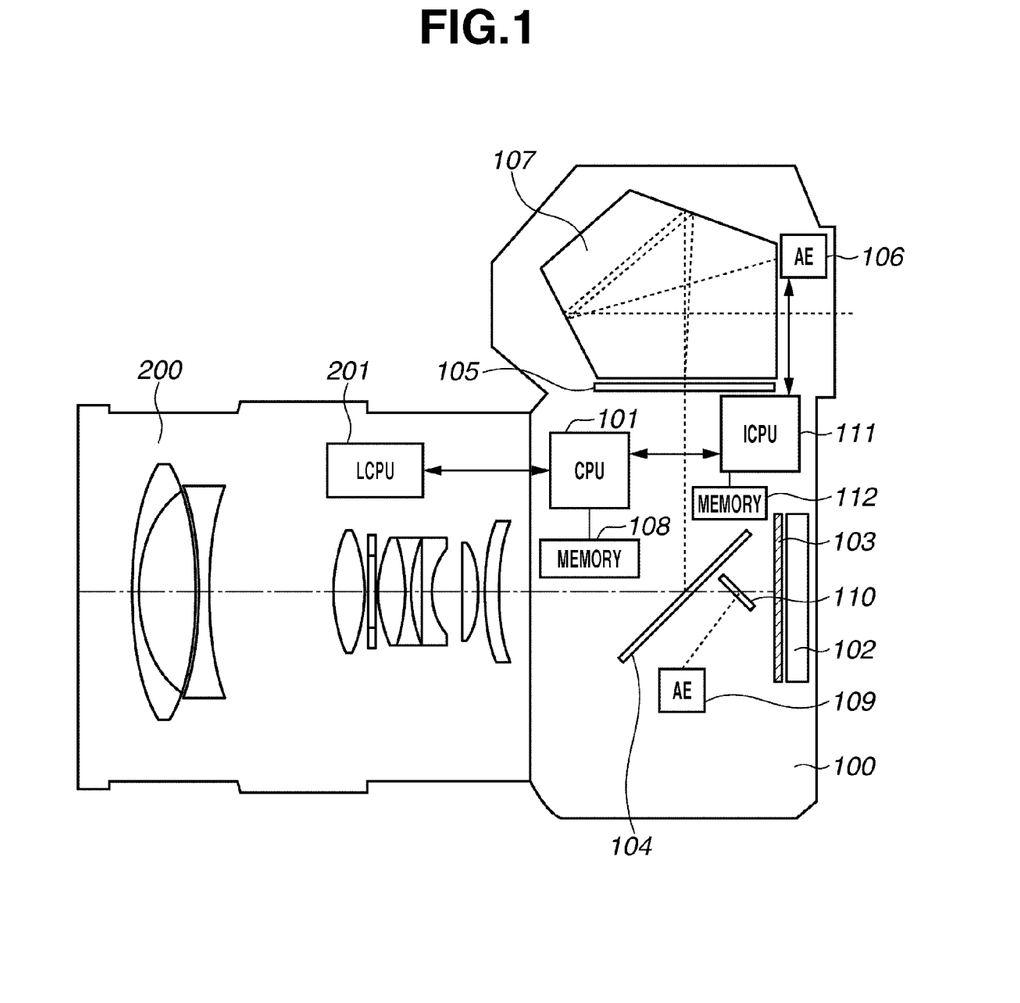
FIG. 1 is a diagram schematically illustrating the construction of an imaging apparatus according to an exemplary embodiment of the present invention.

In the following, a favorable exemplary embodiment of the present invention will be illustrated in detail with reference to the accompanying diagrams. FIG. 1 is a diagram schematically illustrating the construction of an imaging apparatus according to the exemplary embodiment of the present invention; the imaging apparatus is composed of a camera main body 100 and a lens unit 200 detachable from the camera main body 100.

A microcomputer central processing unit (CPU) 101 controls each portion of the camera main body 100. An imaging device 102 such as a charge-coupled device (CCD) or a complementary metal oxide semiconductor (CMOS) including an infrared cut filter, a low-pass filter or the like photo-electrically converts light having entered the imaging apparatus via a photographing lens of the lens unit 200 to output an image signal.

A mechanical shutter 103 is operated to be switched between a state shielding the imaging device 102 from the light having entered via the photographing lens and a retracted state in which it guides the light having entered via the photographing lens to the imaging device 102.

A half mirror 104 is movable to a position where it guides the light having entered via the photographing lens to the imaging device 102 (the mirror-up state: second state) and a position where it guides the light to a light metering sensor 106 (mirror-down state: first state). In other words, the half mirror 104 switches the optical path of the light having entered via the photographing lens between the state guiding the light to the imaging device 102 and the state guiding the light to the light metering sensor 106. When the half mirror is at the position where it guides the light to the light metering sensor 106, the light having entered via the photographing lens is directed to a focusing plate 105 to form an image.

The light metering sensor 106 includes an imaging device such as a CCD, which photo-electrically converts a subject image to accumulate electric charge to output an image signal. The present exemplary embodiment described below employs, as the light metering sensor 106, a CCD having M×N pixels arranged in a matrix-like manner.

A pentagonal prism 107 guides the light having entered via the photographing lens and reflected by the half mirror 104, to the light metering sensor 106 and an optical finder (not illustrated). Memory 108 such as random access memory (RAM), and read only memory (ROM) is connected to the CPU 101. An auto focus (AF) mirror 110 reflects a part of the light having entered via the photographing lens and passed through the half mirror 104, and guides it to an AF sensor in a focus detection circuit 109. The AF sensor has a plurality of AF regions in an imaging frame, making it possible to obtain the defocusing amount in each AF region.

The CPU 101 transmits AF control information based on the output from the focus detection circuit 109 to a lens CPU 201 (hereinafter referred to as the LCPU) configured to control each portion of the lens unit 200. The LCPU 201 drives the photographing lens in the lens unit 200 based on the received AF control information to perform automatic focus adjustment control (hereinafter referred to as the AF control).

A CPU 111 (hereinafter referred to as the ICPU) performs image processing and computation processing on an image signal output from the light metering sensor 106 after electric charge is accumulated. The ICPU performs subject tracking, light metering, face detection, etc. illustrated below based on the image signal output from the light metering sensor 106. The result of the light metering computation by the ICPU 111 is transmitted to the CPU 101, and the CPU 101 sets shutter speed, stop value, etc. based on the result of the light metering computation, and performs exposure control. Memory 112 such as RAM, and ROM is connected to the ICPU 111.

While in the present exemplary embodiment the CPU for performing image processing and computation processing on the image signal output from the light metering sensor 106 is provided separately from the CPU for controlling each portion of the camera main body 100, it is also possible for a single CPU to perform both processing.

Further, the lens unit 200 may be contained in the camera main body 100 or the CPU 101 may drive the photographing lens to perform AF control.

Figure 2:
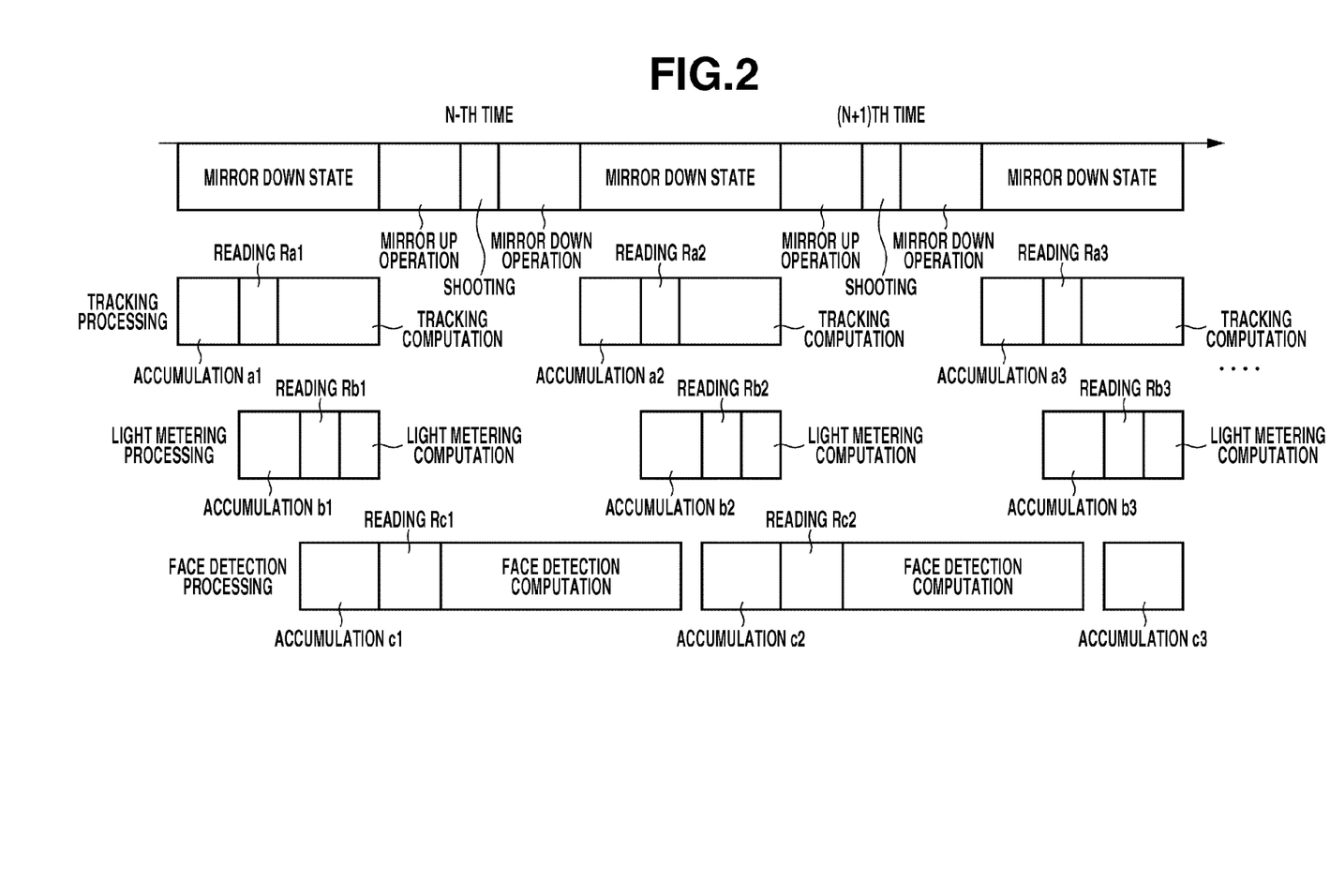
FIG. 2 illustrates an operational sequence during shooting in an exemplary embodiment of the present invention.

Next, the operational sequence at the time of shooting in the present exemplary embodiment will be illustrated with reference to FIG. 2. FIG. 2 illustrates the operational sequence in continuous shooting from the mirror-down state prior to the shooting of the Nth frame (N≥2) to the mirror-down state prior to the shooting of the (N+2)th frame.

First, for the shooting of the Nth frame, the light metering sensor 106 performs accumulation a1 (first accumulation) in the mirror-down state. This accumulation a1 is performed in order to obtain an image signal to be used for subject tracking. The accumulation time is set by the ICPU 111 such that the continuous shooting speed at the time of continuous shooting is not reduced and that the result of the computation for the subject tracking can be reflected in the AF control. Thus, when the shooting speed at the time of continuous shooting is higher than a predetermined value, the accumulation time is set to a time shorter than the flicker period. However, when the accumulation time is too short, a sufficient accumulation is not effected, and the computation for subject tracking cannot be performed, so that the accumulation time is set to a time as required for obtaining an image signal enabling the computation of subject tracking.

Although not illustrated in FIG. 2, accumulation by an AF sensor in the focus detection circuit 109 for performing the AF control is also performed in parallel with the accumulation a1. Defocusing amount computation etc. of each AF region is performed based on the result of the accumulation by the AF sensor. After that, AF control is performed based on the defocusing amount computation result, tracking computation result illustrated below, etc.

In this way, subject tracking is performed based on the image signal obtained through accumulation a1, so that it is possible to perform an AF control in which the tracking result is reflected without reducing a shooting speed at the time of continuous shooting.

When the accumulation a1 is completed, a reading process Ra1, in which the image signals accumulated are read out, is started. Further, in parallel with the reading Ra1, accumulation b1 (second accumulation) is performed. This accumulation b1 is processing for performing a light metering computation in which the influence of the flicker is reduced; its setting is made such that the light metering computation can be completed until the start of the exposure control. In a case where it is desirable not to perform the accumulation b1 in parallel with the reading Ra1, the accumulation b1 may be started after the reading Ra1 has been completed. This also applies to the following reading and accumulation.

In this way, the accumulation b1 is performed subsequent to the accumulation a1, and light metering computation is performed based on the image signal obtained through the accumulation a1 and the image signal obtained through the accumulation b1, so that it is possible to perform an exposure reducing the influence of the flicker.

Figure 3A:
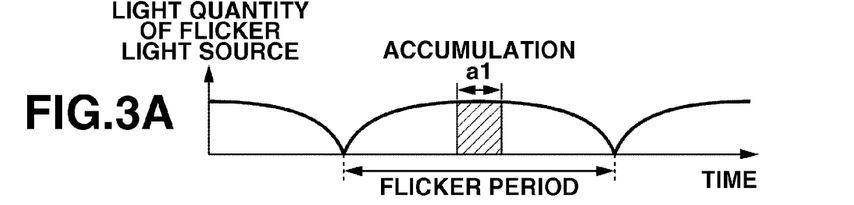
FIGS. 3A, 3B, 3C, 3D, 3E, and 3F are diagrams schematically illustrating a light metering operation in an exemplary embodiment of the present invention.
Figure 3B:
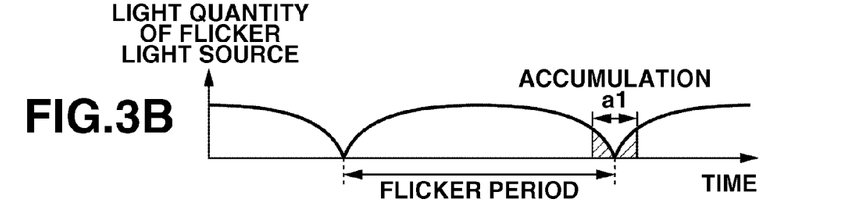
Figure 3C:
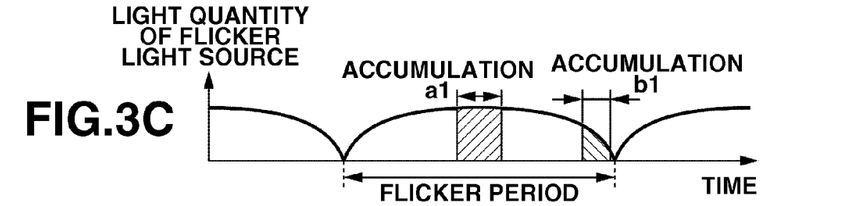
Figure 3D:
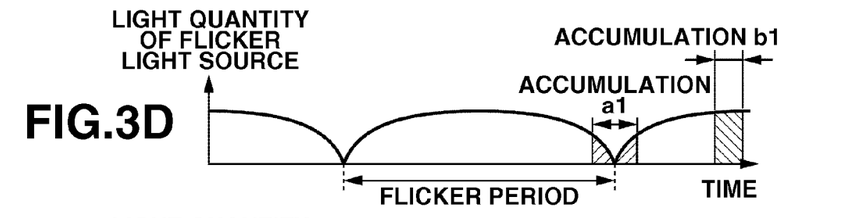

As illustrated in FIGS. 3A and 3B, when the accumulation a1 is shorter than the flicker period, the luminance value based on the accumulated image signals varies depending upon a portion of the phase of the flicker period with which the accumulation a1 overlaps. In view of this, as illustrated in FIGS. 3C and 3D, the accumulation b1 is performed subsequent to the accumulation a1, and the light metering computation is performed based on the image signals accumulated in each of them. As a result, as compared with the case in which the light metering computation is performed based solely on the image signals accumulated in the accumulation a1, the total accumulation time of the image signals used for light metering computation is lengthened. Thus, the influence of the flicker is reduced as compared with the case in which the light metering computation is performed based solely on the image signals accumulated in the accumulation a1, making it possible to perform a more accurate exposure control. Further, the phase of the overlapping flicker period is made different between the accumulation a1 and accumulation b1, so that the fluctuation in the average value of the flicker source light quantity during the accumulation periods combining the accumulation a1 and accumulation b1 is reduced, thus stabilizing the light metering computation result and making it possible to perform a more accurate exposure control.

If the sum total of the accumulation time of the accumulation a1 and the accumulation tie of the accumulation b1 is set to be substantially equal to an integral multiple of the flicker period, it is possible to further reduce the influence of the flicker.

Next, when the reading Rat is completed, subject tracking computation is started. It is necessary for the subject tracking computation to be completed by the time when the AF control is started, and the ICPU 111 sets the accumulation time of the accumulation a1 such that the tracking computation is completed by the time the AF control is started.

And, when the accumulation b1 is completed, reading Rb1, in which the accumulated image signals are read out, is started. Further, accumulation c1 (third accumulation) is performed in parallel with the reading Rb1. This accumulation c1 is processing for obtaining an image signal to be used for the face detection of the subject. However, the face detection computation requires more time as compared with the tracking computation and light metering computation, so that if the detection result is to be reflected in the AF control or the like for the shooting performed immediately after the completion of the accumulation c1, a shooting speed is reduced at the time of continuous shooting. If the shooting speed is not to be reduced at the time of continuous shooting, the face detection computation cannot be completed in time for the AF control or the like for the shooting performed immediately after the completion of the accumulation c1. In view of this, the result of the face detection computation using the image signals obtained through the accumulation c1 is used for the AF control not for the shooting performed immediately after the completion of the accumulation c1 but for the next shooting.

Reading Rc1, in which the image signals accumulated in the accumulation c1 are read can be executed even in the mirror-up state, so that the accumulation time of the accumulation c1 is set by the ICPU 111 such that the series of processing from the start of the accumulation a1 to the completion of the accumulation c1 are completed in the mirror-down state. Before the reading Rc1, in which the image signals accumulated in the accumulation c1 are read, is completed, a mirror-up operation is started. Thus, the face detection computation is performed after the mirror-up operation has been started. Similarly, after this processing, accumulations a2, b2, and c2 and accumulations a3, b3, and c3 are performed in the mirror-down state before the shooting of the (N+1) th frame and the (N+2) th frame is carried out.

As illustrated above, in the present exemplary embodiment, the accumulations a1, b1, and c1 are performed in the mirror-down state; however, it is also possible to perform an intermittent accumulation in each accumulation in order to reduce the influence of the flicker in various processing.

As shown in FIGS. 3A and 3B, when the accumulation a1 is shorter than the flicker period, the luminance value based on the accumulated image signals varies depending on a portion of the phase of the flicker period with which the accumulation period overlaps.

Figure 3E:
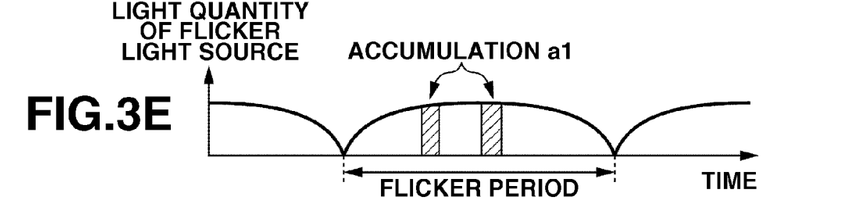

In view of this, as illustrated in FIG. 3E, a plurality of accumulations are performed intermittently, with each accumulation being performed for a time obtained by dividing the accumulation time when accumulation is performed collectively, by the number of accumulations. In other words, the accumulation time illustrated in FIG. 3A is equal to the sum total of the accumulation time of the plurality of accumulations illustrated in FIG. 3E. And, the image signal obtained through the intermittent accumulation is used as the image signal obtained through the accumulation a1.

When intermittent accumulation is performed, the phase of the flicker period overlapping with the accumulation time is dispersed, so that it is possible to reduce the influence of the flicker as compared with the case where normal accumulation is performed.

In the above intermittent accumulations, instead of reading the image signal each time accumulation is completed, it is desirable to integrate the image signals accumulated in each accumulation and read the image signals after all the accumulations have been completed. By this processing, the reading of the image signal after each accumulation can be omitted, making it possible to reduce the processing load.

Such intermittent accumulation may also be executed in at least one of the accumulations a1, b1, and c1, or may be switched between whether intermittent accumulation is to be performed or not according to each accumulation time. For example, intermittent accumulation may be performed in the case where the accumulation time is shorter than the flicker period and where the influence of the flicker is expected to be great.

Figure 3F:
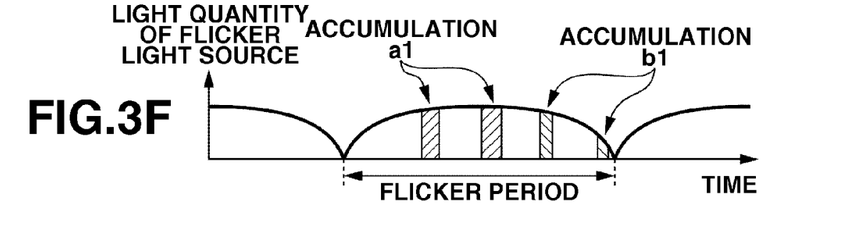

Further, as illustrated in FIG. 3F, when intermittent accumulation is performed in both the accumulation a1 and accumulation b1, the phase of the flicker period overlapping with the accumulation period is further dispersed as compared with the case of FIGS. 3C and 3D, thus making it possible to achieve a further reduction of the influence of the flicker.

Figure 4:
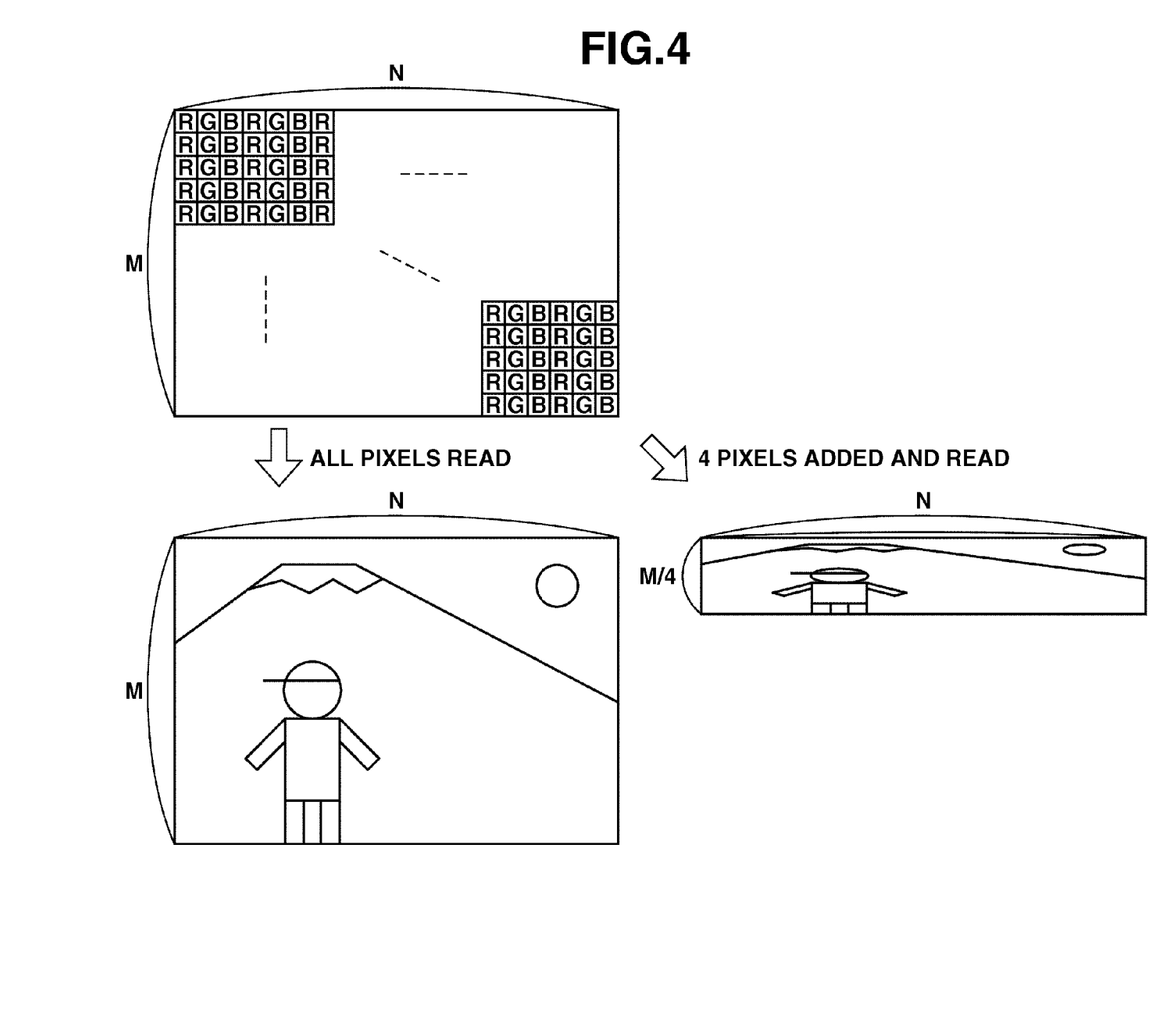
FIG. 4 is a diagram illustrating a difference due to a pixel addition number of a read image in a light metering sensor according to an exemplary embodiment of the present invention.

Next, an image signal reading method according to the present exemplary embodiment will be illustrated with reference to FIG. 4. In the present exemplary embodiment, a stripe type CCD is used as the light metering sensor 106. In the stripe type CCD, the pixels of red (R), green (G), and blue (B) are arranged in a stripe-like manner as illustrated in FIG. 4; in such a stripe type CCD, it is possible to perform pixel addition in an analog manner in the vertical direction.

When, for example, pixel addition is performed with four pixels, the size of the image based on the read image signal is reduced to ¼ in the vertical direction. At this time, due to the pixel addition, the output level of the image signal is approximately four times the level when no pixel addition is performed (when all the pixels are read), so that it is possible to obtain an image of a brightness equivalent to that of the image based on the image signal read without performing pixel addition in an accumulation time reduced to approximately ¼. Further, the image signal read amount is also reduced as compared with that when no pixel addition is performed, so that it is possible to shorten the requisite time for image signal reading.

Further, in the reading Ra1, Rb1, by performing pixel addition reading as illustrated above, it is possible to obtain an image signal enabling subject tracking computation in a short accumulation time also in tracking a dark subject. Through the pixel addition reading, a reduction in accumulation time and an increase in the influence of the flicker are to be expected; however, when combined with the above-illustrated intermittent accumulation, it is possible to suppress the influence of the flicker.

When pixel addition is performed, the image resolution deteriorates. Therefore, detection accuracy is reduced in a case where subject face detection is performed through recognition of features such as the case where it is determined whether a human face exists in an image, through matching with a previously prepared face pattern. Thus, when performing subject face detection by such a method, it is desirable to perform all pixel reading without performing pixel addition in the reading Rc1, in which the image signals accumulated in the accumulation c1 for obtaining an image signal for subject face detection, are read.

Figure 5:
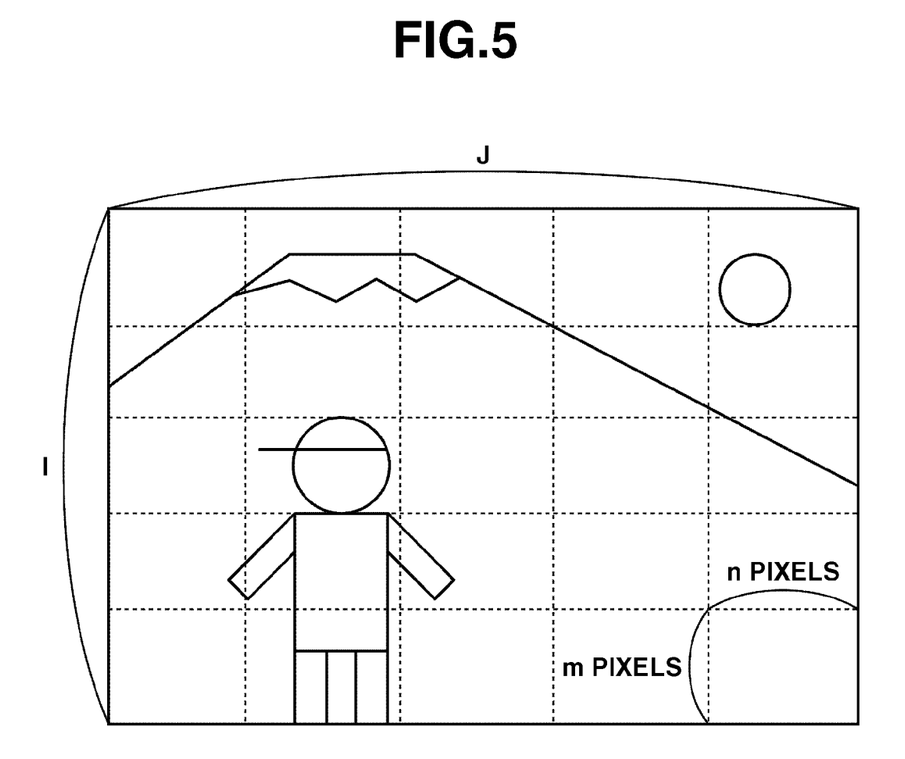
FIG. 5 is a diagram illustrating a light metering computation in an exemplary embodiment of the present invention.

Next, light metering computation according to the present exemplary embodiment will be illustrated with reference to FIG. 5. As illustrated in FIG. 5, the image based on the image signal obtained through accumulation at the light metering sensor 106 is divided into I (in the vertical direction)×J (in the horizontal direction) light metering regions. Here, each light metering region includes m (in the vertical direction)×n (in the horizontal direction) pixels; I×m=M, and J×n=N; thus, the light metering sensor 106 as a whole has M×N pixels.

And, in each light metering region, the respective average outputs Ra, Ga, and Ba of the R, G, and B pixels are calculated to calculate the luminance value Yij of each light metering region from the calculated Ra, Ga, and Ba. The luminance value Yij is obtained, for example, by the following equation (1):

$$Yij = A \times Ra + B \times Ga + C \times Ba \quad (1)$$

By substituting appropriate values into the mixing ratios A, B, and C of the R, G, and B pixels, the luminance Yij is obtained.

Next, weighted average computation is performed, in which a weight is assigned to the Yij of each light metering region according to the light metering mode such as evaluation light metering or spot light metering to obtain the luminance value of the entire light metering region. The above light metering computation is performed on the image signal obtained through the accumulation a1 and the image signal obtained through the accumulation b1 to acquire the respective luminance values Y1 and Y2.

Here, assuming that the accumulation time of the accumulation a1 is T1 and that the accumulation time of the accumulation b1 is T2, the final luminance value Y to be used for the exposure control can be expressed by the following equation (2).

$$Y = (Y1/T1 + Y2/T2) \times T1/2 \quad 2$$

The above equation (2) is used to obtain the average value of the luminance values when the accumulations a1 and b1 are both performed in the accumulation time T1; however, the formula for obtaining the final luminance value is not restricted to equation (2). For example, it may also be an equation for obtaining the average value of the luminance values when the accumulations a1 and b1 are both performed in the accumulation time T2. In obtaining the final luminance value in this way, the weighted average of the luminance value Y1 and the luminance value Y2 is obtained. Further, it may also be an equation for obtaining the average value of the luminance values when the accumulations a1 and b1 are both performed in a predetermined accumulation time Ts.

Further, equation (3) may also be employed, in which the accumulation time of the accumulation a1 and the accumulation time of the accumulation b1 are equalized and in which the accumulation time of each of them is reduced to half the flicker period, thus simplifying the weighted average computation.

$$Y = (Y1 + Y2)/2 \quad (3)$$

By setting each accumulation time such that the total accumulation time, which is the sum total of the accumulation time of the accumulation a1 and the accumulation time of the accumulation b1, is the same as the flicker period, it is possible to further reduce the influence of the flicker.

The accumulation time of the accumulations a1, b1, and c1 may be set to previously determined times, or may be set by the ICPU 111 based on the preceding light metering result. In the case where the setting is made by the ICPU 111 based on the result of the preceding light metering computation, the setting is made, for example, such that the accumulation time is shorter when the final luminance value Y is high than when the final luminance value Y obtained from the preceding light metering computation result is low.

Next, the subject tracking computation will be illustrated. In the tracking computation in the present exemplary embodiment, comparison is made, for example, between the image obtained through the accumulation a1 and the image obtained through the accumulation a2, and computation (pattern matching) is performed to determine where the tracking object has moved, based on the distribution of the luminance pattern and color pattern of the tracking object satisfying a predetermined condition. More specifically, tracking of an object satisfying a predetermined condition is performed in the shooting frame. And, AF control is performed while changing the AF region where focusing is effected following the movement of the tracking object. Alternatively, exposure control is performed while changing the weighting with respect to each light metering region following the movement of the tracking object.

FIG. 6 is a diagram illustrating AF control following the movement of a tracking object. In the initial state of continuous shooting, when the main subject exists at the position of FIG. 6A within the shooting frame, an AF frame 7 at the position where the main subject exits is set as the frame indicating the AF region for focusing to perform AF control.

In FIGS. 6A through 6D, the AF frame set as the frame indicating the AF region for focusing is indicated by a frame thicker than the other AF frames.

After AF control has been performed to effect focusing at a region corresponding to the AF frame 7, an accumulation is performed to obtain an image signal to be used for subject tracking. The ICPU 111 sets a predetermined region using the AF frame 7 as a reference as the tracking region in the obtained image. In the tracking region, the matching of luminance pattern and color pattern is performed in the tracking computation. While it is also possible to read the image signal used for the subject tracking computation by performing pixel addition, in the case of the image illustrated in FIGS. 6A through 6D, all pixels are read.

Figure 6A:
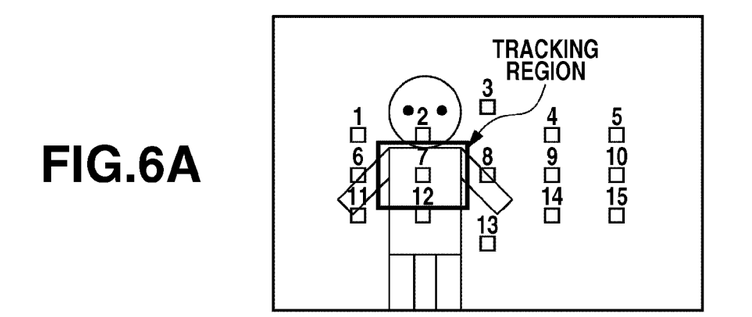
FIGS. 6A, 6B, 6C, and 6D are diagrams illustrating an AF control performed following a movement of a tracking object.
Figure 6B:
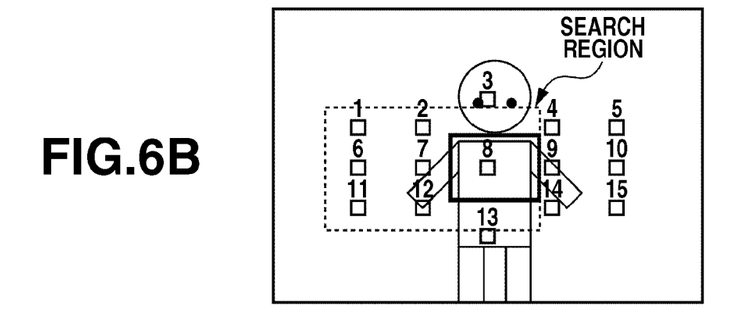

After this, suppose the position where the main subject exists has moved to the position of FIG. 6B, and accumulation for obtaining the image signal for the next subject tracking is performed. To determine what position the tracking object has moved in the obtained image, the ICPU 111 sets a predetermined region, using the tracking region set based on the AF frame 7 as a reference, as a search region, which is a region where the tracking object is searched for. The search region includes the tracking region, and is set to be larger than the tracking region.

Within the search region of the image obtained this time, the ICPU 111 determines whether there exists a region matching the tracking region of the image obtained the last time in terms of luminance pattern and color pattern. When the search region is set large, tracking is possible even if the position of the tracking object has greatly changed; however, the larger the search region, the longer the requisite time for determination, so that the search region is set by taking into account the tracking accuracy and the time that can be utilized for the tracking computation.

When it is determined that there exists within the search region a region matching the tracking region, the AF frame existing within the region is set as the AF frame indicating the AF region where the next focusing is effected. In FIG. 6B, the AF frame 8 corresponds to that frame. Then, shooting is performed after AF control has been performed so as to effect focusing in a region corresponding to the AF frame 8.

When it is determined that there exists within the search region a region matching the tracking region, it can be determined that there exists a matching region if there exists a region whose degree of matching with the tracking region is not less than a predetermined value.

Further, the ICPU 111 newly sets a region matching the tracking region of the image obtained previously, in the image obtained currently, as the tracking region.

Figure 6C:
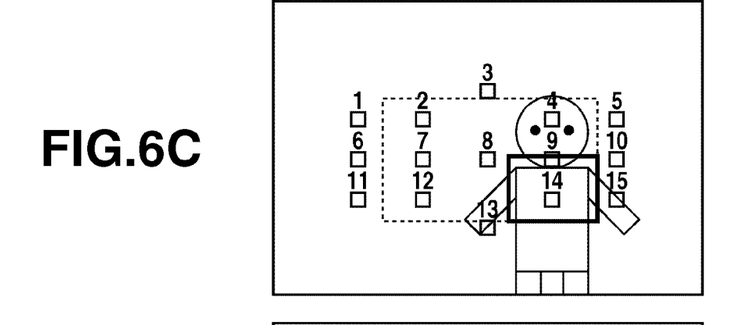

After this, suppose the position where the main subject exists has moved to the position as illustrated in FIG. 6C, and, in this state, accumulation for obtaining the image signal for the next subject tracking has been performed. To determine to what position the tracking object has moved within the image thus obtained this time, the ICPU 111 sets the search region using the position of the tracking region as a reference. More specifically, since the tracking region newly set the last time is a region centering on the AF frame 8, the search region is accordingly changed from the preceding one.

Figure 6D:
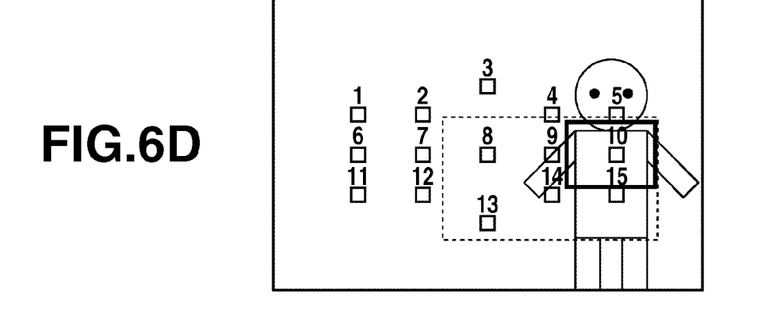

Similarly, in FIG. 6D, in which the position of the main subject has moved from the position in FIG. 6C, the search region is changed to perform the search of the tracking object. After this processing, tracking computation is performed prior to each shooting at the time of continuous shooting, so that it is always possible to perform shooting focusing on the main subject taken as the tracking object in the initial state.

In each tracking computation at the time of continuous shooting, if the tracking computation results in failure, for example, in the case where the tracking computation has resulted in failure in the state of FIG. 6C of FIGS. 6A through 6D, in carrying out the tracking computation in the state of FIG. 6D, the tracking computation can be performed based on the tracking region of FIG. 6B. More specifically, the search of a region matching the tracking region of the image illustrated in FIG. 6B is performed. In this case, the position of the subject is expected to change more than in the case where the tracking computation is performed between successive images, so that the search may be performed by setting the search region wider than normal.

Alternatively, when the tracking computation results in failure in each tracking computation at the time of continuous shooting, the tracking object may be re-set again. When the accumulation time of each image used for the tracking computation of the subject is shorter than the flicker period, brightness may vary due to the influence of the flicker. In such a case, image comparison may be performed after processing for making a brightness level of the images substantially the same is carried out.

Further, it is also possible to use the face detection computation result for the above-described subject tracking computation; by using the face detection result, it is possible to perform the subject tracking more accurately. In the following, the subject tracking computation using the face detection result will be illustrated with reference to FIG. 7. FIG. 7 is a diagram illustrating an AF control following the movement of the tracking object in the case where the face detection result is used. Regarding the technique for detecting a human face, any one of the well-known methods may be adopted; for example, it is possible to adopt a method in which light metering data is transformed into hue and saturation. By preparing and analyzing a two-dimensional histogram thereof, a face region can be determined. Alternatively, it is possible to adopt a method in which a face candidate region corresponding to human face features is extracted and a face region is determined from the feature amount in the region.

Figure 7A:
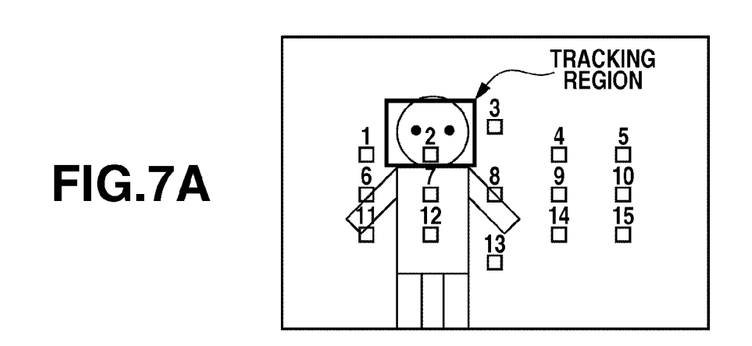
FIGS. 7A, 7B, 7C, and 7D are diagrams illustrating an AF control performed following a movement of a tracking object in a case where a face detection result is utilized in an exemplary embodiment of the present invention.

In the case where the main subject exists at the position of FIG. 7A in the initial state of continuous shooting, AF control is performed so as to focus on the AF region corresponding to the AF frame 7 situated where the main subject exists. In FIGS. 7A through 7D, the AF frame set as the frame indicating the AF region where focusing is effected is indicated by a thicker frame than the other AF frames. In this state, a region other than the face of the main subject may be set as the AF region where focusing is effected.

And, in the state in which focusing has been effected on the region corresponding to the AF frame 7, accumulation is performed to obtain the image signal to be used for subject tracking and accumulation to obtain the image signal to be used for the subject face detection. Then, face detection computation is performed based on the obtained image signal to set the subject face region detected as the tracking region in the image to be used for the subject tracking.

Figure 7B:
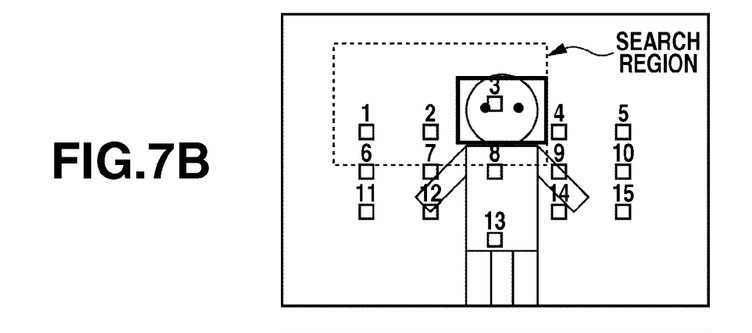

After this, suppose, when the position where the main subject exists has been changed to the position of FIG. 7B, accumulation is performed to obtain the image signal to be used for the next subject tracking and accumulation to obtain the image signal to be used for the subject face detection. To determine to what position the tracking object has moved in the image thus obtained this time, a search region is set using the position of the tracking region in the image obtained the last time as a reference. More specifically, in the image illustrated in FIG. 7A, a region near the AF frame 2 is used as the subject face region according to the face detection computation, and this face region is set as the tracking region, so that the search region is set to a predetermined region using this face detection region as a reference.

Then, within the search region of the image obtained this time, a search is made as to whether there exists a region matching the luminance pattern and color pattern of the tracking region of the image obtained the last time.

In the case where there exists within the search region a region matching the tracking region, the AF frame existing in that region is set as the AF frame indicating the AF region for the next focusing. In FIG. 7B, the AF frame 3 corresponds to that frame. Then, shooting is performed after AF control is performed so as to focus on a region corresponding to the AF frame 3.

In this case, the face detection computation using the image signals accumulated when the subject exists at the position of FIG. 7B cannot be performed in time for the AF control, so that the result of the face detection computation is used for the tracking computation in the next AF control.

Further, face detection computation is performed using the image signals accumulated when the subject exists at the position of FIG. 7B. The detected subject face region is newly set as the tracking region in the image to be used for subject tracking. In this way, by setting the tracking region of each tracking computation based on the result of the face detection computation, it is possible to accurately track the face region of the tracking object.

When the region matching the preceding tracking region in the image used for the subject tracking computation obtained this time and the detected subject face region are substantially the same, a region matching the preceding tracking region may be set as the new tracking region.

Figure 7C:
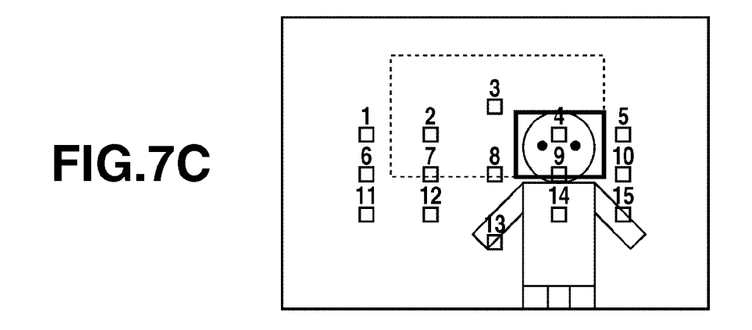

After this, suppose, when the position where the main subject exists has been moved to the position of FIG. 7C, the accumulation is performed to obtain the image signal to be used for the next subject tracking and the accumulation is performed to obtain the image signal to be used for the subject face detection.

To determine to what position the tracking object has moved in the image thus obtained this time, a search region is set using the position of the tracking region in the image obtained last time. More specifically, the tracking region of the preceding image is a region which centers on the AF frame 3 where the subject face region exists in the state of FIG. 7B, so that the search region is accordingly changed from the preceding one. In the case where a region matching the tracking region exists within the search region, the AF frame existing within that region is set as the AF frame indicating the AF region for the next focusing. In FIG. 7C, the AF frame 4 corresponds to that frame. Then, shooting is performed after AF control has been performed to focus on the region corresponding to the AF frame 4.

Figure 7D:
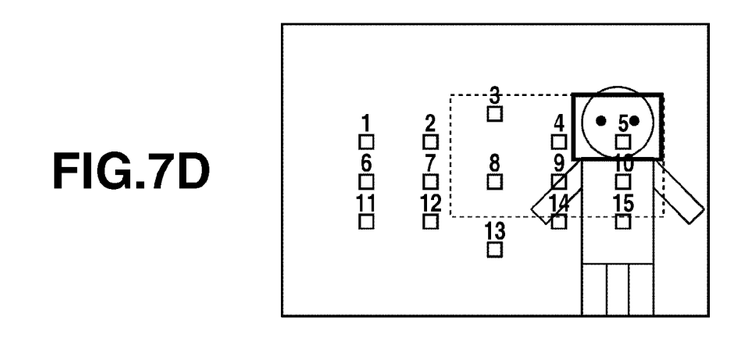

Also at the position illustrated in FIG. 7D, to which the position of the main subject has been moved from the position in FIG. 7C, the tracking object is searched for, while the face region is detected by the face detection computation using the image signals accumulated when the subject exists at the position of FIG. 7C, the face region being set as the tracking region for the search.

Also after this processing, tracking computation is performed using the face detection result, prior to each shooting at the time of continuous shooting, so that it is always possible to perform shooting while focusing on the main subject used as the tracking object in the initial state, in particular, the face region of the main subject.

In FIG. 7, the AF control is performed to focus on the AF region corresponding to the face region of the detected subject. However, also in the region below the face region of the subject, the subject distance is regarded substantially equal to that in the face region, so that in the case, for example, where no AF region corresponding to the face region of the subject detected exists, focusing may be effected on the AF region corresponding to the region below the face region of the detected subject.

As illustrated above, accumulation operation by the light metering sensor 106 is performed a plurality of times prior to each shooting at the time of continuous shooting, and subject tracking is performed based on the image signals obtained through the first accumulation operation, so that it is possible to perform subject tracking without reducing a shooting speed at the time of continuous shooting. Further, exposure control is performed based on image signals obtained through accumulation operation performed a plurality of times, so that when the accumulation time of a single accumulation operation is shorter than the flicker period, it is possible to perform exposure control reducing the influence of the flicker.

Further, the face detection result based on the image signals obtained through accumulation by the light metering sensor 10 in the preceding mirror-down state is used in the tracking computation for the shooting this time. Therefore, it is possible to perform subject tracking in which the detection result of the subject detection is reflected, without reducing a continuous shooting speed.

While in the present exemplary embodiment described above, the luminance pattern and color pattern serving as a reference in tracking computation are updated each time an image to be used for subject tracking is obtained, it is also possible to perform tracking computation while maintaining the luminance pattern and color pattern first determined as the tracking reference.

Further, while in the present exemplary embodiment the accumulation for light metering computation is performed a plurality of times, such as accumulation a1 and accumulation b1, it is not necessary to perform the accumulation for light metering computation a plurality of times in the case where continuous shooting is not performed or in the case where sufficient accumulation time can be secured by a single accumulation, for example, before the shooting of the first frame in continuous shooting. However, the accumulation for light metering computation may be performed a plurality of times even in the case where continuous shooting is not performed or in the case where sufficient accumulation time can be secured by a single accumulation, for example, before the shooting of the first frame in continuous shooting.

Further, in the case where continuous shooting is performed, when the continuous shooting speed is higher than a predetermined value, the accumulation for light metering computation is performed a plurality of times. However, there is no need to perform the accumulation for light metering computation a plurality of times when the continuous shooting speed is not higher than the predetermined value.

Further, even in the case where the accumulation is performed a plurality of times, such as accumulation a1 and accumulation b1, there is no need to employ the image signals obtained through the accumulation a1 for the light metering computation if sufficient accumulation time is secured in the accumulation b1.

In addition, to further reduce the influence of the flicker, the accumulation for light metering computation may be performed in a larger quantity than in the exemplary embodiment illustrated above.

Further, while in the present exemplary embodiment the detection of the face region of a human subject is performed through face detection computation, it is also possible to perform subject detection, using a subject region satisfying other predetermined conditions as the detection object. For example, the user may previously set a subject region as the detection object, and the set subject region may be detected in the subject detection computation thereafter.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
an imaging device configured to accumulate electric charge in accordance with an incident light quantity;
a processor configured to detect a subject region; and
the processor configured to perform a subject tracking;
wherein the imaging device performs a first accumulation and a second accumulation after the first accumulation, before the shooting,
wherein the processor performs the subject tracking for a subsequent shooting in a continuous shooting, based on an image signal obtained through the first accumulation immediately before the subsequent shooting is performed in the continuous shooting, and a detection result of the processor based on an image signal obtained through the second accumulation immediately before a previous shooting is performed in the continuous shooting, without using a detection result of the processor based on an image signal obtained through the second accumulation immediately before the subsequent shooting is performed in the continuous shooting.

2. The imaging apparatus according to claim 1, further comprising:
a light metering sensor; and
a mirror configured to change an optical path of light entering via a photographing lens,
wherein a state of the mirror is changed between a first state in which the light is guided to the imaging device, and a second state in which the light is guided to the light metering sensor, and
wherein the imaging device performs the first accumulation and second accumulation in the first state of the mirror.

3. The imaging apparatus according to claim 2,
wherein the image signal obtained through the second accumulation is read out in the second state of the mirror.

4. The imaging apparatus according to claim 3,
wherein the state of the mirror is changed to the second state when shooting is to be performed and to the first state after shooting has been performed, in continuous shooting, and
wherein the imaging device is adapted to perform the first accumulation and the second accumulation from when the state of the optical path is changed from the second state to the first state until the optical path is changed from the first state to the second state.

5. The imaging apparatus according to claim 3,
wherein the processor is configured to perform exposure control,
wherein the imagine device performs a third accumulation in the first state of the mirror,
wherein the third accumulation is performed between the first accumulation and the second accumulation, and
wherein the processor performs exposure control based on the image signal obtained through the first accumulation and an image signal obtained through the third accumulation.

6. The imaging apparatus according to claim 5,
wherein the image signal obtained through the first accumulation and the image signal obtained through the third accumulation is read out in the first state of the mirror.

7. The imaging apparatus according to claim 1,
wherein the processor is configured to perform focus adjustment based on a subject tracking result,
wherein the processor completes the subject tracking computation before the processor performs the focus adjustment.

8. The imaging apparatus according to claim 3,
wherein the processor is configured to perform focus adjustment based on the subject tracking result,
wherein the processor performs focus adjustment in the second state of the mirror.

9. The imaging apparatus according to claim 8,
wherein the imagine device performs the first accumulation in an accumulation time enabling the processor to complete the subject tracking computation before the focus adjustment is performed.

10. The imaging apparatus according to claim 1,
wherein the processor performs the subject tracking with respect to the subject region detected by the processor.

11. The imaging apparatus according to claim 1,
wherein the processor detects a face region of a subject.

12. The imaging apparatus according to claim 1,
wherein the imaging device outputs an image signal that has undergone pixel addition through the first accumulation, and an image signal that has not undergone pixel addition through the second accumulation.

13. A method of controlling an imaging apparatus including an imaging device which accumulates electric charge in accordance with an incident light quantity, the method comprising:
performing a first accumulation by the imaging device;
performing a second accumulation by the imaging device after the first accumulation, the first accumulation and the second accumulation being performed before shooting;
detecting the subject region based on an image signal obtained through the second accumulation;
tracking a subject based on an image signal obtained through the first accumulation and the detection result of the detecting,
wherein the tracking is performed for a subsequent shooting in a continuous shooting, based on an image signal obtained through the first accumulation immediately before the subsequent shooting is performed in the continuous shooting, and a detection result of a processor based on an image signal obtained through the second accumulation immediately before a previous shooting is performed in the continuous shooting, without using a detection result of the processor based on an image signal obtained through the second accumulation immediately before the subsequent shooting is performed in the continuous shooting.

\* \* \* \* \*